Dec. 2, 1969     L. D. SMITH     3,480,971
ARTIFICIAL EYES HAVING A CHANGEABLE PUPIL AND MOVABLE IRIS
PORTION ACTUATED BY MUSCLE TISSUE
Filed Feb. 21, 1967     2 Sheets-Sheet 1
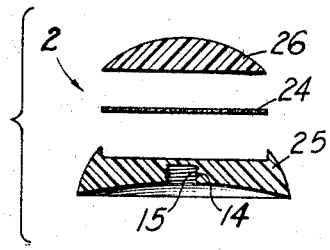
Fig I
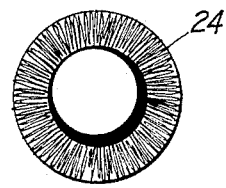
Fig II
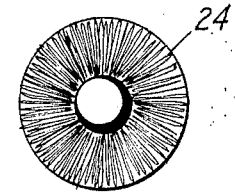
Fig III
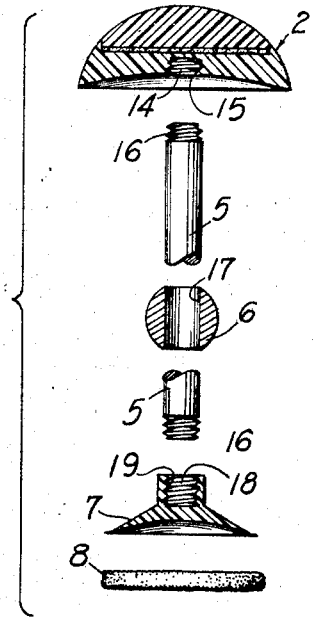
Fig IV
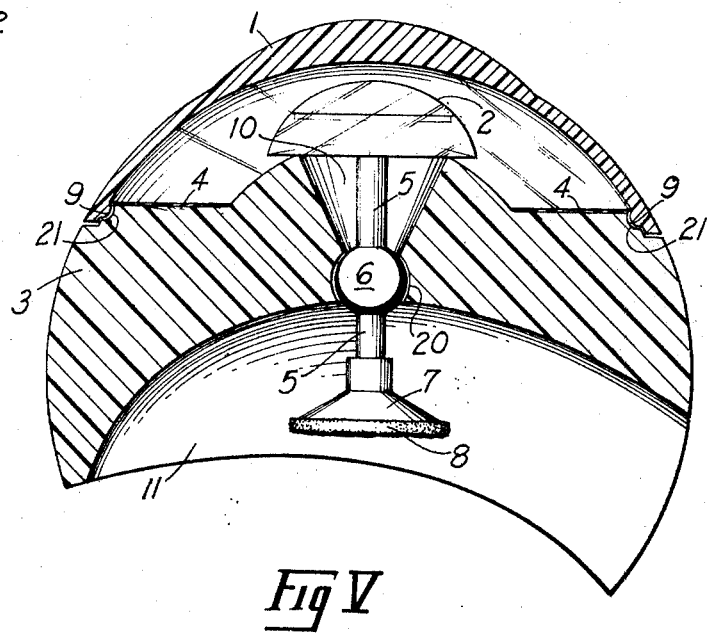
Fig V
INVENTOR
Leonard Donald Smith

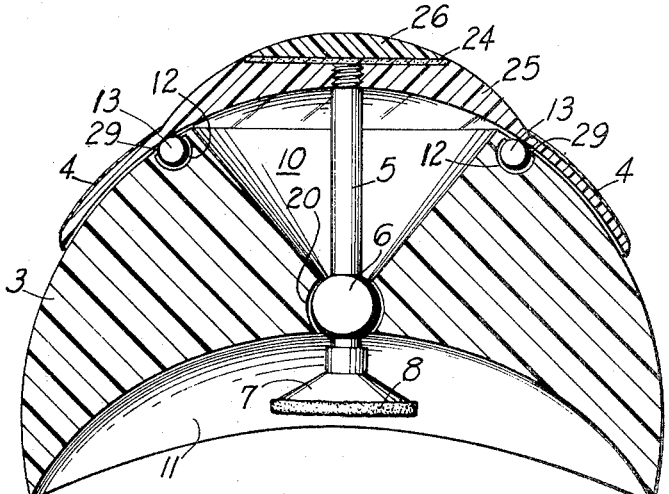
Fig VI
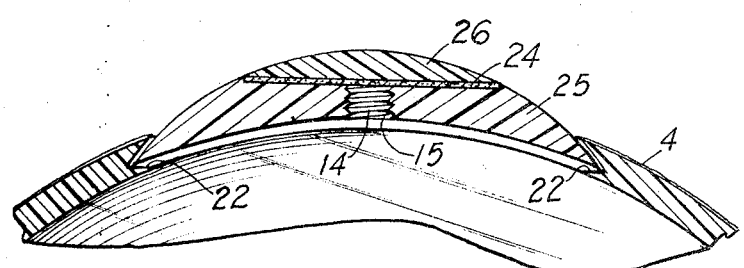
Fig VII
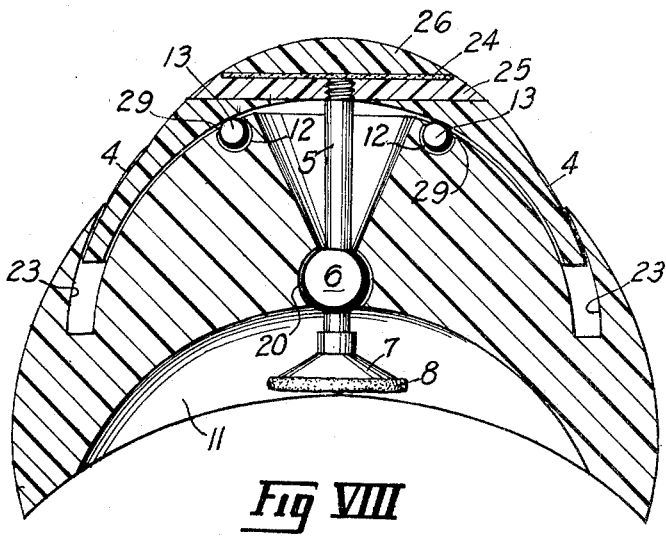
Fig VIII
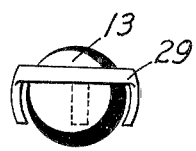
Fig IX
INVENTOR
Leonard Donald Smith

United States Patent Office 3,480,971
Patented Dec. 2, 1969

3,480,971
ARTIFICIAL EYES HAVING A CHANGEABLE
PUPIL AND MOVABLE IRIS PORTION
ACTUATED BY MUSCLE TISSUE
Leonard Donald Smith, Box 753,
Warner Robins, Ga. 31093
Filed Feb. 21, 1967, Ser. No. 618,306
Int. Cl. A61f 1/16
U.S. Cl. 3—13
6 Claims

ABSTRACT OF THE DISCLOSURE

Artificial eye for use as replacement for a natural eye includes a body portion receivable in the natural eye socket, the body carrying a movable and detachable iris and pupil portion whose motion is obtained by the natural muscle acting through a suction cup thereon and connected to the body through a universal bearing on the body. A transparent cover over the iris and pupil portion may be fixed relative to the iris and pupil portion on the body.

---

The invention relates to artificial eyes constructed of plastic or improved materials, wherein the iris portion, or the iris and scleral portions combined, move in a manner similar to the movements of the natural eye. The invention differs from products of the known art by method of construction, function, and advantage to the user, with the principal distinction being that component parts of the artificial eye are not permanently connected into a solid instrument. The advantages achieved by deviating from the prior concept of single-unit, one-piece construction are a further distinguishing factor.

Existing deficiencies in the present art, such as restricted movement, uncontrolled eye secretions, unchangeable pupil size, sagging eyelids, and air pockets between the artificial eye and the eye socket, are objects for improvement in the invention.

The principal object of the invention is to produce an artificial eye which will closely resemble a natural eye in both appearance and movement, and which will provide comfort to the user by eliminating some of the irritating deficiencies in artificial eyes of the present art.

Novel features achieved by the invention are:

(1) The production of an artificial eye which permits additional movement within the eye socket of an individual, beyond the movement normally permitted in artificial eyes constructed of one integral body;

(2) The production of an artificial eye wherein the component parts are interchangeable with component parts of another artificial eye. The primary advantage to this feature is that the iris portion can be changed to permit the pupil size to match the pupil size of the natural eye. The natural pupil, of course, expands or decreases in size depending upon the lighting condition to which the user is exposed:

(3) The production of an artificial eye wherein the component parts are adjustable;

(4) The production of an artificial eye which controls eye secretions;

(5) The production of an artificial eye which is partially self-supporting within the eye socket, and by being so, eliminates the formation of air pockets between the artificial eye and the eye socket; and (6) The production of an artificial eye which permits the eyelids to contribute additional movement to the iris and scleral portions of the artificial eye.

Other objects and advantages of the invention will become apparent from the following description taken in connection with the annexed drawings, and it will also become apparent that many changes in the details of construction, arrangement of parts, and method shown and described may be made without departing from the spirit of the invention. The invention should not be limited to the exact details of construction, arrangement of parts, and method shown and described, since the preferred form only will be given by way of illustration.

It is particularly pointed out that the description of improvements in the invention do not generally apply to artificial eyes which are permanently connected to the muscle tissues of the eye socket, except where said artificial eyes are constructed in a manner which will infringe upon the artificial eyes of the invention.

The invention comprises three distinct, but closely related artificial eyes, wherein the method of construction, design, and function are so intimately connected that incorporation herein is considered appropriate.

At this point, the three types of eyes are described as; an artificial eye where in the iris portion is a separate, moveable part, being moveable beyond that point normally permitted in artificial eyes of the present art; an artificial eye wherein the iris and scleral portions are separate parts also movable, outside the socket portion, beyond that point normally permitted in artificial eyes of the present art; and an artificial eye wherein the iris and scleral portions are separate parts also moveable, inside the socket portion, beyond that point normally permitted in artificial eyes of the present art.

The artificial eyes of the invention are not dependent upon the body of the artificial eye for movement, as are artificial eyes of the present art.

For the purpose of brevity and clarity, materials and molds used throughout the specification are explained prior to the detailed description.

Materials commonly used in the art, such as methyl methacrylate, methacrylic resins, acrylic resins, methyl acrylate, butyl acrylate, polystyrene, the like, or any known artificial resin capable of withstanding eye secretions and which will not excessively irritate the socket tissues, are acceptable for use herein. Methyl methacrylate is the preferred material in the invention. Color pigments are added, as required, prior to molding to produce the desired color in the finished product. Of course, improved materials, as developed, will be used to improve the artificial eyes.

Excluding the iris portion, the several parts of the invention are formed by placing the desired plastic, with or without color pigment added thereto, into a mold cavity of the desired shape and size, and by subjecting the mold to sufficient heat and pressure to cause the plastic to assume the shape of the mold cavity. When sufficiently hardened, the plastic is removed and buffed or polished to provide the desired smooth outer surfaces.

The molds used in forming the component parts are preferably constructed by skilled persons so that the desired shape and size will be produced without excessive grinding or sanding; however, the molds can be handmade of clay, plaster, or other similar materials.

A mold is required for each of the component parts, and the mold cavity must be meticulously designed to produce the desired characteristics in the final product.

The advantages provided in the artificial eyes of the invention, named at the onset of the specification, are further described to show the method of achieving the advantages.

Referring to FIGURES II and III of the annexed drawings wherein the iris portion of the artificial eyes of the invention are shown, the pupil is first shown in an expanded dimension, and secondly in a contracted dimension. By nature, the iris portion of a natural eye adjusts itself to the particular lighting conditions to which an individual is exposed. However, the iris portion of an artificial eye of the present art has a set pupil size, which is unchangeable regardless of the lighting condition to which the used is exposed. Normally, persons requiring artificial eyes are provided with a pupil size which will match the pupil size of the natural eye under a given circumstance; i.e., the lighting of the office where the individual works, etc.

This deficiency is improved in the invention, by furnishing individuals using the artificial eye of the invention various iris portions, wherein the pupil size has been expanded and contracted to match the pupil size of the natural eye under various lighting conditions. The iris portion 2 of the invention is removable at will by the user.

Other component parts are changable, in the same manner as described in the preceding description. The shaft 5, bearings 13, suction cup 7, washer 8, and iris portion 2 are completely removable, and can be transferred from one artificial eye of the invention to another, as desired.

Another significant advantage is the control of eye secretions. The washer 8 collects eye secretions of the eye socket, stores the moisture, and reduces the eye secretions which bypass the eyelids to become visible on the face of the artificial eye. Further, the washer 8 permits the artificial eyes of the invention to grip the muscle tissue of the eye socket to hold the artificial eye firmly in position, thereby eliminating air pockets which normally form between the artificial eye and the eye socket in artificial eyes of the present art.

Artificial eyes of the present art are held in position within the eye socket primarily by the eyelids, and after periods of time the eyelids begin to sag due to the pressure applied thereto. Now, the artificial eyes of the invention reduce the pressure previously applied to the eyelids, by providing a suction cup and washer combination which grip the muscle tissue of the eye socket to allow only a minimum of pressure to be applied to the eyelids.

It is the present practice of the art to periodically exchange the artificial eye of the individual, and the size of the artificial eye is normally enlarged at each exchange. The enlargement produces greater pressure on the eyelids, thereby holding the artificial eye firmly against the muscle tissues of the eye socket, creating better movement of the artificial eye until such time as the eyelids have again been stretched. As can be seen, this practice leads to enlarging the eye socket, stretching the eyelids, and magnifies the artificial appearance of an artificial eye. The artificial eyes of the invention are designed to eliminate exchanging the artificial eye of an individual, except for the purpose of matching the size of the natural eye.

Preservation of the elasticity of the eyelids is a major feature of the invention. As previously referenced, the artificial eyes of part two and part three of the invention permits the eyelids to contribute movement to the artificial eye and the stronger the eyelids of an individual, the more movement in the artificial eye. The artificial eye of part one of the invention, of course, is moveable only as are artificial eyes of the present art, except the iris portion is moveable beyond that point normally permitted in artificial eyes of the present art.

The method of achieving the increased movement in the artificial eyes of the invention is:

By having the iris portion, or the iris and scleral portions combined, a separate, movable part of the artificial eye; wherein the iris portion, or the iris and scleral portions combined, are connected to a suction cup device which, by design, attaches itself to the muscle tissues of the eye socket, and thereby assumes the same movements; the shaft, being extended through a fixed or otherwise bearing, permits the movements of the suction cup to be transmitted to the iris portion, or the iris and scleral portions combined, creating the movement to simulate the movements of the natural eye.

The foregoing description will be expanded throughout the following specification, and it will be shown that simple, efficient, and economical means and methods are provided for accomplishing all of the objects and advantages of the invention.

Referring to the annexed drawings, wherein

FIGURE I is a side elecational view in section of an iris portion of an artificial eye;

FIGURE II is a front view of an iris portion of an artificial eye, wherein the pupil is expanded;

FIGURE III is a front view of an iris portion of an artificial eye, wherein the pupil is contracted;

FIGURE IV is an exploded side elevational view partly in section of the internal mechanism of the invention, wherein an iris portion is connected to a shaft, which is extended through a cylindrical chamber of a bearing and connected to a suction cup, which is connected to a washer;

FIGURE V is a side elevational view partly in section of an artificial eye, wherein the iris portion is moveable separately and apart from the movements of the remainder of the artificial eye;

FIGURE VI is a side elevational view partly in section of an artificial eye, wherein the iris and scleral portions combined are moveable separately and apart from the movements of the reminder of the artificial eye:

FIGURE VII is a side elevational view in section of the scleral and iris portions of the artificial eye described in FIGURE VI;

FIGURE VIII is a side elevational view partly in section of an artificial eye, wherein the iris and scleral portions combined are movable within the socket portion of the artificial eye, separately and apart from the movements of the remainder of the artificial eye: and FIGURE IX is a side elevational view of a clamp encased around a roller bearing showing the method for holding the bearing in position.

Referring specifically to FIGURE V of the annexed drawings, the artificial eye of part one of the invention is described.

The artificial eye is comprised of a moveable iris portion 2, and a scleral portion 4, a socket portion 3, a transparent plastic covering 1, and a shaft 5, a bearing 6, a suction cup 7, and a washer 8.

The socket portion 3, being the largest single component and the base for assembling the invention, is formed of a whitish translucent plastic material, such as methyl methacrylate, having a white or other desired color pigment added thereto. The plastic is placed into a mold cavity of the desired shape and size to fit the eye socket of an individual. The mold, with the plastic therein, is subjected to sufficient heat and pressure to cause the plastic to assume the shape of the mold cavity. When sufficiently hardened, the plastic is removed from the mold cavity and is buffed and polished to smooth the outer surface. As referenced previously, meticulate design of the mold cavity has produced the necessary characteristics in the finished socket portion 3 to permit assembly of the invention.

A cavity 10 is provided on the front of the socket portion 3, extending from front to back, slightly smaller in diameter than the iris portion 2, and the cavity 10 tapers in diameter from the front to the back.

A groove 20 is provided at the back of the cavity 10 to permit insertion of a bearing 6, by snapping the bearing 6 into position.

And, a recession 11 is provided on the back of the socket portion 3 similar to the contour of the muscle tissue of the eye socket, but the recession 11 is deeper into the socket portion 3 to permit only the outer perimeter of the socket portion 3 to touch the muscle tissue of the eye socket when the artificial eye is inserted therein.

The socket portion 3 is now provided with a scleral portion 4, which is formed on the front side by painting a vein structure to match that of the natural eye.

When the paint used in forming the scleral portion has dried, a thin coating of transparent plastic is applied to the socket portion 3, and when dried, the socket portion 3 is further buffed or polished to remove the excess plastic and provide the desired smooth outer surface.

An iris portion 2 is formed by photographing the iris portion of the natural eye, using the negative to develop a positive, and by gluing the positive 24 to a base 25 of the desired thickness. A coating of transparent plastic 26 is applied to the front of the positive 24 to preserve the natural appearance. The plastic coating 26 is buffed and polished to smooth the outer surfaces. FIGURE I of the annexed drawings shows the formation of the iris portion 2, as described above. The positive 24, the base 25, and the coating of transparent plastic 26 form the iris portion 2, and throughout the specification and the annexed drawings, frequent reference will be made to the iris portion 2, without necessarily referring to the composite parts.

A transparent covering 1 is developed by the molding process, by placing a transparent plastic into a mold cavity of the desired shape and size and by subjecting the mold to sufficient heat and pressure to cause the plastic to assume the shape of the mold cavity. The transparent covering 1 is shaped to simulate the visible portion of the natural eye, and is provided with catches 9 which are to interlock with the catches 21 provided on the socket portion 3, permitting the transparent covering 1 to be snapped onto the front of the socket portion 3. After molding, the transparent covering 1 is buffed and polished to smooth the outer surface.

A suction cup 7 is formed of a plastic by the molding process in the shape and size desired to permit placement within the socket portion 3. The front of the suction cup 7 is provided with a countersink 18, which is threaded 19, to permit insertion of a shaft 5. The back of the suction cup 7 is contoured to fit the muscle tissue of the eye socket, to attach itself thereto to assume identical movements. The suction cup 7 is smaller in perimeter than the socket portion 3, to permit movement when the artificial eye is placed into the natural eye socket. The outer rim of the suction cup 7 is slightly flanged to permit insertion of a washer 8, to aid the suction cup 7 in sticking to the muscle tissue to help support the artificial eye within the eye socket, and permit the suction cup 7 to move with the muscle tissues of the eye socket.

The washer 8 is formed of a spongy, absorbent material which must be non-irritating to the muscle tissues of the eye socket. Sponge is preferred in the invention because of elastic and absorbent qualities. The washer 8 produces the advantages of helping to support the weight of the artificial eye within the eye socket, thereby preserving the elasticity of the eyelids, helping to keep the artificial eye firmly affixed within the eye socket to preclude the formation of air pockets between the artificial eye and the eye socket, helping to absorb excessive eye secretions, and helping to reduce dryness of the eye socket by storing the moisture within the eye socket and not permitting the eye secretions to become visible on the face of the artificial eye.

Having described the major component parts of the artificial eye of part one of the invention, the assembly is described.

The bearing 6 is inserted into the groove 20 by snapping the bearing 6 into position. The bearing 6 revolves freely with little or no lubrication.

One end of the shaft 5, which is threaded 16, is inserted into the countersink 14 on the back of the base 25 of the iris portion 2, and the shaft 5 is affixed thereto by twisting into position.

The opposite end of the shaft 5 is inserted through the cylindrical chamber 17 provided in the bearing 6, so that the shaft 5 extends through the bearing 6.

The suction cup 7 is placed over the shaft 5 and twisted to the desired degree of tightness.

The washer 8 is stretched over the flanged rim of the suction cup 7.

The transparent covering 1 is snapped onto the front of the socket portion 3, so that the catches 9 and 21 will interlock, completing the assembly of the artificial eye.

Part two of the invention has been previously described as an artificial eye having a moveable iris 2 and scleral 4 portions combined, moveable outside the socket portion 3 of the artificial eye, as shown in FIGS. VI and VII of the annexed drawings. Materials are identical to those used in part one of the invention, but the molds, of course, are designed to produce the desired characteristics in the several parts.

The socket portion 3 is formed of a whitish translucent plastic material, such as methyl methacrylate, having a white or other desired color pigment added thereto. The plastic is placed into a mold cavity of the desired shape and size to permit the finished socket portion 3 to be inserted into the natural eye socket. Further, by design of the mold cavity, the finished socket portion 3 contains; two indentations 12 on the front of the socket portion 3; a cavity 10 centrally located in the socket portion 3, slightly smaller in diameter than the iris portion 2, and the cavity 10 extends from the front to the back of the socket portion 3, tapering in diameter from front to back; a groove 20 at the back of the cavity 10, and a recession 11 on the back of the socket portion 3, as described in part one of the invention are provided.

A scleral portion 4 is formed of a translucent plastic material, such as methyl methacrylate, having a white or other desired color pigment added thereto. The scleral portion 4 is shaped similar to the visible portion of the natural eye, with the outer edges being extended to permit extension over the front of the socket portion 3. The scleral portion 4 moves separate and apart from the socket portion 3, when the two parts are joined together, without exposing the socket portion 3 to view.

The finished scleral portion 4 is provided with an indentation 22 centrally located to permit insertion of the iris portion 2 therein to complete the replica of the visible portion of the natural eye.

After molding, the scleral portion 4 is buffed to provide the desired smoothness.

Assembling this part of the invention, the bearing 6 is snapped into the grove 20 provided in the cavity 10 of the socket portion 3; two bearings 13 are snapped into the indentations 12 provided on the front of the socket portion 3; the bearings 13 are provided with a clamp 29 as indicated in FIGURE IX of the annexed drawings. The iris portion 2 is snapped into the indentation 22 provided in the scleral portion 4; one end of the shaft 5, which is threaded 16, is inserted into the countersink 14 on the back of the base 25 of the iris portion 2, and the shaft 5 is affixed thereto by twisting into position; the opposite end of the shaft 5 is inserted through the cylindrical chamber 17 provided in the bearing 6, so that the shaft 5 extends through the bearing 6; the suction cup 7 is placed over the shaft 5 and twisted to the desired degree of tightness; and the washer 8 is stretched over the flanged rim of the suction cup 7, completing assembly of part two of the invention.

Part three of the invention has been previously described as an artificial eye having a moveable iris 2 and scleral 4 portion, with the movement being within the socket portion 3 of the artificial eye.

The socket portion 3 is formed of a whitish translucent plastic material having the desired shade of white, or other color pigment added thereto. The plastic is placed into a mold of the desired shape and size and the mold is subjected to sufficient heat and pressure to cause the plastic to assume the shape of the mold cavity. The finished socket portion 3 contains a circular groove 23 around the front part of the socket portion 3, extending rather deep into the socket portion 3 to permit the scleral portion 4 to be moveable when the two parts are joined together; two indentations 12 are provided on the front of the socket portion 3; a cavity 10 centrally located, extending from front to back, and tapering in diameter from front to back is provided. The front of the cavity 10 is slightly smaller in diameter than the iris portion 2; a groove 20 at the back of the cavity 10 is provided; and a recession 11 on the back of the socket portion 3, shaped similar to the contour of the muscle tissue of the eye socket is provided, except the recession 11 is deeper into the socket portion to provide space for the suction cup 7 to be moveable.

The scleral portion 4 is the same as described in part two of the invention, except, of course, the shape of the scleral portion 4 is more circular to permit movement within the socket portion 3.

The iris portion 2 is the same throughout the invention.

Proceeding with the assembly, the iris portion 2 is snapped into the indentation 22 provided in the scleral portion 4; one end of the shaft 5, which is threaded 16, is inserted into the indentation 14 on the back of the base 25 of the iris portion 2, which is also threaded 15, and the shaft 5 is affixed thereto by twisting into place; the bearing 6 is snapped into the groove 20 provided in the cavity 10 of the socket portion 3; clamps 29 are snapped onto two small bearings 13; two small bearings 13 are then snapped into the indentations 12 provided on the front of the socket portion 3; the opposite end of the shaft 5 is inserted into the cylindrical chamber 17 provided in the bearing 6 so that the shaft 5 extends through the bearing 6; the suction cup 7 is placed over the shaft 5 and twisted to the desired degree of tightness; the washer 8 is stretched over the flanged rim of the suction cup 7.

It is to be understood that the scleral portion 4 fits into the circular groove 23 provided in the socket portion 3, and the scleral portion 4, with the iris portion 2 inserted therein, moves to simulate the movements of the natural eye. The two small bearings 13 permit the scleral portion 4 to move freely, as directed by the movements of the muscle tissue of the eye socket.

Part three of the invention is now assembled.

The artificial eyes illustrated in FIGURES VI and VIII of the annexed drawings contain two small bearings 13 as shown on the drawings and as previously described in the specification. The bearings 13 are held in position by a clamp 29 which encases the bearing lightly, permitting the bearing to revolve freely to provide efficient movement of the iris and scleral portions as directed by the movements of the suction cup.

A further advantage to the invention is the use of adhesive patches, containing an adhesive on both sides, to be placed on the scleral portion, beneath the eyelids to permit users of the artificial eye to stick the eyelids thereto, correcting sagging eyelids, etc. Of course, the use of adhesive patches is optional, based upon whether or not the user needs, or desires, this feature. To illustrate the point, if the user had a sagging eyelid in the lower right hand corner of the artificial eye, an adhesive patch would be placed immediately underneath the location of the sagging eyelid. Consequently, when the artificial eye was inserted into the eye socket, the adhesive patch would stick to the inside of the eyelid, and the user could raise the eyelid to the "natural" point, then press the eyelid against the adhesive patch, thereby correcting the sagging condition.

Having described the invention, I claim:

1. In an artificial eye for use as a replacement for a natural eye which has been removed comprising, a socket portion forming a main body having a size and shape adapted to be received within the natural eye socket, said main body having a front side and a rear side, an iris portion provided with a pupil portion detachably and movably mounted on the front side of said main body for relative movement thereto, a transparent generally concave-convex covering member removably mounted over said iris and pupil portions, motion transmitting means extending through said main body having one end detachably attached to said iris portion and having its other end provided with a cup means adapted to engage the muscle tissue of the natural eye socket, whereby movement of the natural eye muscle tissue will impart similar movement to said iris and pupil portions with respect to said main body.

2. An artificial eye as defined in claim 1, wherein said pupil portion is detachably mounted to said iris portion whereby the relative size of said pupil portion may be changed.

3. An artificial eye as defined in claim 1, wherein said motion transmitting means comprises a shaft having a bearing mounted thereon, said bearing being mounted in a groove in said main body for generally universal movement, said shaft being detachably connected to said iris portion by a threaded connection, and said cup means being a suction cup detachably connected to the other end of said shaft.

4. The artificial eye as defined in claim 3, in which said suction cup is provided with a washer like member made of spongy, absorbent material adapted to contact the natural eye muscles and function as a reservoir of moisture to control eye secretions.

5. An artificial eye as defined in claim 1, wherein said transparent member forms a scleral member which is connected to said iris portion and is movable with said iris portion in response to movement of said motion transmitting means.

6. An artificial eye as defined in claim 5, in which the front side of said main body is provided with a circular groove extending therearound, said scleral member having a peripheral portion received within said circular groove for movement therein in response to movement of said motion transmitting means.

References Cited

UNITED STATES PATENTS

| 303,726 | 8/1884 | Hamecher | 3—13 |
| 2,302,148 | 11/1942 | Senecoff | 46—169 |
| 2,322,117 | 6/1943 | Dimitry | 3—13 |
| 2,618,898 | 11/1952 | Wilhelm | 46—169 |
| 2,792,573 | 5/1957 | Clarke et al. | 3—13 |
| 2,854,788 | 10/1958 | Baggott. | |
| 3,091,893 | 6/1963 | Brudney et al. | |

FOREIGN PATENTS

| 70,795 | 8/1893 | Germany. |
| 466,566 | 10/1928 | Germany. |
| 512,985 | 2/1955 | Italy. |

RICHARD A. GAUDET, Primary Examiner

R. L. FRINKS, Assistant Examiner